(12) United States Patent
Naccache

(10) Patent No.: US 8,219,469 B2
(45) Date of Patent: Jul. 10, 2012

(54) METHOD OF PROVIDING TRANSACTION DATA, TERMINAL, TRANSACTION METHOD, METHOD OF ENHANCING BANK STATEMENTS, SERVER, SIGNALS AND COMPUTER PROGRAM PRODUCTS CORRESPONDING THERETO

(75) Inventor: David Naccache, Paris (FR)

(73) Assignee: Compagnie Industrielle et Financiero d'Ingenierie "Ingenico", Neuilly sur Seine (FR)

( * ) Notice: Subject to any disclaimer, the term of this patent is extended or adjusted under 35 U.S.C. 154(b) by 16 days.

(21) Appl. No.: 11/924,323

(22) Filed: Oct. 25, 2007

(65) Prior Publication Data

US 2008/0103912 A1     May 1, 2008

(30) Foreign Application Priority Data

Oct. 25, 2006 (FR) ...................... 06 09391

(51) Int. Cl.
*G07B 17/00* (2006.01)
*G07F 19/00* (2006.01)
*G06Q 20/00* (2012.01)

(52) U.S. Cl. .......................... 705/30; 705/16
(58) Field of Classification Search ................ 705/16, 705/30
See application file for complete search history.

(56) References Cited

U.S. PATENT DOCUMENTS

| 5,910,988 | A  | * | 6/1999 | Ballard | 705/75 |
| 6,397,194 | B1 | * | 5/2002 | Houvener et al. | 705/16 |
| 7,117,173 | B1 | * | 10/2006 | Ambani | 705/35 |
| 2003/0158844 | A1 | * | 8/2003 | Kramer et al. | 707/6 |
| 2004/0027611 | A1 | * | 2/2004 | Leiman et al. | 358/1.15 |
| 2004/0064373 | A1 | * | 4/2004 | Shannon | 705/24 |
| 2004/0215543 | A1 | * | 10/2004 | Betz et al. | 705/35 |
| 2004/0225567 | A1 | * | 11/2004 | Mitchell et al. | 705/16 |
| 2005/0010505 | A1 |   | 1/2005 | Darrell | 705/35 |
| 2005/0114215 | A1 | * | 5/2005 | Tramontano et al. | 705/16 |
| 2006/0184441 | A1 | * | 8/2006 | Haschka et al. | 705/35 |
| 2008/0077501 | A1 | * | 3/2008 | Kamei et al. | 705/14 |

FOREIGN PATENT DOCUMENTS

EP    1 662 450 A1    5/2006

OTHER PUBLICATIONS

French Search Report dated Jul. 10, 2007 for corresponding French Application No. FR0609391, filed Oct. 25, 2006.

* cited by examiner

*Primary Examiner* — Ig T An
(74) *Attorney, Agent, or Firm* — David D. Brush; Westman, Champlin & Kelly, P.A.

(57) ABSTRACT

A method is provided for supplying data representative of transactions between a client and at least one merchant, via a banking institution. The banking institution issues a statement to the client which, for each transaction, includes a statement line containing at least one reference for said transaction and/or the merchant, and an amount corresponding thereto. The method includes a transaction phase, including: storing data representative of said transaction, in a statement server; acquiring and storing, in an illustrative data server, at least one information representative of a photograph and/or illustration representative of said merchant, called illustrative information. A supplying phase includes: creating the statement, associating to at least one of the statement lines the data representative of the transaction and at least some of the illustrative information, and/or at least one information pointing via one hyperlink to at least some of said illustrative information, called access information.

12 Claims, 3 Drawing Sheets

| | 600 date | 601 wording | 602 amount | 603A Merchant link | 604A Good/service link |
|---|---|---|---|---|---|
| 60 | 01/01/06 | ABC Corp. | 50 € | Merchant photo | purchase photo |
| 61 | .... | .... | .... | .... | .... |
| 62 | .... | .... | .... | .... | .... |
| | .... | .... | .... | .... | .... |

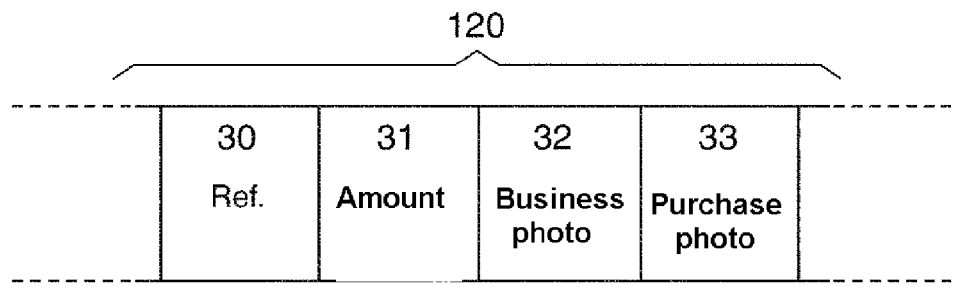
Fig. 3
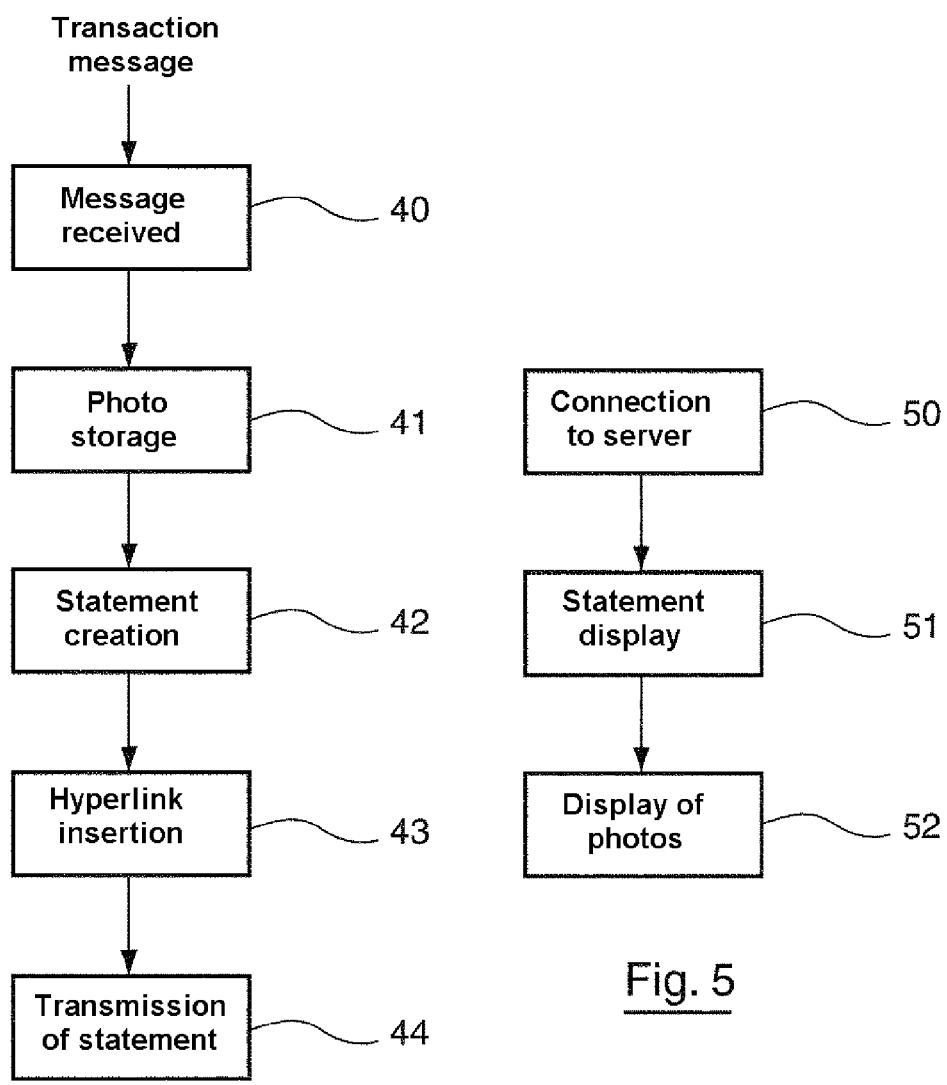
Fig. 4
Fig. 5

Fig. 6A

| date | wording | amount | Merchant link | Good/service link |
|---|---|---|---|---|
| 01/01/06 | ABC Corp. | 50 € | Merchant photo | purchase photo |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |

| date | wording | amount | Merchant photo | purchase photo |
|---|---|---|---|---|
| 01/01/06 | ABC Corp. | 50 € | FLOWERS ABC | 🌸 |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |

603B — 604B
60, 61, 62

METHOD OF PROVIDING TRANSACTION DATA, TERMINAL, TRANSACTION METHOD, METHOD OF ENHANCING BANK STATEMENTS, SERVER, SIGNALS AND COMPUTER PROGRAM PRODUCTS CORRESPONDING THERETO

CROSS-REFERENCE TO RELATED APPLICATION

None.

FIELD OF THE DISCLOSURE

The field of the disclosure is that of transactions between clients and merchants. More particularly, the disclosure applies to statements representative of such transactions, provided by the banking institutions managing the transactions and accessible to the client on a terminal.

More precisely yet, the disclosure relates to improving the data appearing on these statements, which include, in particular, information transmitted by the merchants via their payment terminals, at the time of the transaction.

BACKGROUND

Banking institutions can deliver various statements to their clients and, in particular, statements in computerized form or statements in paper form.

Various display formats exist for computerized statements, depending, in particular, on the issuing banking institution.

Generally speaking, a computerized bank statement has a certain amount of information relating to the transactions conducted out by the client, commonly presented in the form of lines, each representing a particular transaction.

This information, for example, has the date of the transaction, the amount thereof, and a reference for the merchant with whom the transaction was conducted.

One disadvantage in these computerized statements is due to the fact that they do not have detailed information about the merchant.

As a matter of fact, the reference, or identification of the merchant is most often incomplete and useless to the client who wishes to have details about the transaction in question, especially when they consult their statement a certain period of time after the transaction, or when the transaction took place in a country using a different set of characters from that of the client (for example, a French client in China). This reference corresponds to the identification of the merchant which said merchant records at the moment when they activate their payment terminal, and may correspond, for example, to the name of the merchant, their company name, or at best to the name of their business.

These statements also have the disadvantage of not providing any information about the transaction in and of itself, i.e., the subject goods or services of this transaction.

The same difficulties are encountered with paper statements.

SUMMARY

An aspect of the disclosure relates to a method of supplying data representative of transactions between a client and at least one merchant, via a banking institution, said banking institution issuing a statement to said client which, for each transaction, includes a statement line containing at least one reference for said transaction and/or said merchant, and an amount corresponding thereto.

According to the disclosure, said method comprises:
 a transaction phase comprising said following steps:
  storage of data representative of said transaction, in a statement server;
  acquisition and storage in an illustrative data server of at least one information representative of a photograph and/or illustration representative of said merchant, called illustrative information;
 a supplying phase of said statement comprising said following steps:
  creation of said statement, associating to at least one of said statement lines said data representative of said transaction on one hand, and on the other hand at least some of said illustrative information, and/or at least one information pointing via one hyperlink to at least some of said illustrative information, called access information;
  transmission of said statement.

According to a first embodiment of the disclosure, the statement thus obtained can be issued or provided in paper form and forwarded to the client by mail, for example, after it has been printed by the banking institution.

In a second embodiment, said statement can be a computerized statement capable of being viewed on a client terminal.

Thus, the method enables the client viewing a bank statement in paper form, or in computerized form on their terminal, to access information more specifically detailing the transaction or the merchant, in a simple and ergonomic way.

According to a first advantageous embodiment, the illustrative information can include at least one photograph and/or illustration representative of said transaction and/or said merchant.

According to a second advantageous embodiment, which, if appropriate, can be combined with the first, the illustrative information can include at least one hyperlink returning to at least one data server containing photographs and/or illustrations representative of said transaction and/or said merchant.

In this case, advantageously, at least one of said hyperlinks points to at least one photograph and/or illustration representative of said merchant.

In this way, the client can obtain visual information about the merchant with whom they have conducted a transaction, thereby facilitating verification of the transactions on the statement and more easily enabling detection of possible transaction errors. As a matter of fact, visually displaying the business can, for example, enable the client to remember having actually conducted a transaction in said business.

According to another advantageous aspect of the disclosure, at least one of said hyperlinks points to at least one photograph and/or illustration representative of at least one subject good or service of said transaction.

In this way, by clicking on a link on their computerized bank statement, the client can also access an illustration/photograph corresponding more specifically to the transaction concerned, i.e., to the subject goods or service of the transaction. Thus, the client can, for example, view the goods purchased (e.g., a photograph characteristic of a country in which the client has purchased a stay from a tour organiser).

According to one preferred embodiment, said transaction phase comprises said following steps:
 acquisition of at least one photograph and/or illustration representative of said merchant;
 creation of a transaction message containing data representative of a transaction and data corresponding to said photograph(s) and/or illustration(s);
 transmission of said transaction message to said banking institution.

These various steps, implemented by the transaction terminal or the server of the banking institution, make it possible to provide the client with an enhanced computerized bank statement, containing photographs or illustrations representing the merchant or business or links to photographs or illustrations representing the merchant or business.

According to a first alternative, at least one of said photographs and/or illustrations is stored in the transaction terminal of said merchant, and is included in said transaction message.

In this way, at the moment they activate their transaction terminal, the merchant will register a photograph/illustration of their choice making it possible to identify them. This photograph/illustration can represent the merchant themselves, the main facade of their business, the interior of their business, their business sign, a logo, an html link to the Internet site for the business, etc.

The merchant can then update the photograph or illustration in the transaction terminal memory.

According to a second alternative, at least one of said photographs and/or illustrations is transmitted via said transaction terminal to said banking institution during an initialization step and is stored in said data server.

In another alternative embodiment, the transaction terminal can transmit to the banking institution statement server a reference for a good, instead of inserting a photograph/illustration concerning this good, so that the statement server inserts a hyperlink to the reference in the merchant's Internet catalogue, instead of a hyperlink to a photograph/illustration.

For example, the photograph and/or illustration enabling identification of the merchant can be sent to the banking institution at the moment the transaction terminal is initialized, and can then be stored by the data server. In this way, the transaction terminal does not need to return this information representative of the merchant at each transaction; it is the banking institution which supplies the information.

According to yet another embodiment of the disclosure, compatible of course with the previous ones, the illustrative information includes a hyperlink leading to an Internet site for said merchant.

Thus, the link to the merchant can point to the home page of the merchant's Internet site, and the links to the subject goods and services of the transaction can, for example, point to corresponding pages in a catalogue available on the merchant's Internet site.

According to one particular embodiment, the method includes a step for obtaining at least one photograph by means of a camera device connected to or built into a transaction terminal.

Thus, for example, a photographic device can be connected to the transaction terminal for transferring thereto photographs taken of goods purchased. These photographs can then be stored in the terminal temporarily, prior to being inserted into the transaction message sent by the terminal to the banking institution.

In the case of a subject service of the transaction, a digital photographic device can be used, in which illustrations of services available from the merchant can be stored in memory, which will then forward the illustration corresponding to the transaction to the transaction terminal.

According to one alternative, a photographic device can be built into the transaction terminal, so as to facilitate implementation of the method.

According to yet another alternative, said illustrative information is stored in a transaction terminal of said merchant and transmitted by said transaction terminal to said banking institution asynchronously, with respect to a corresponding transaction message, said transaction message containing at least one reference to said illustrative information.

In this way, since the transmission of photographs and illustrations occurs asynchronously (for example, the evening following the transaction), the transaction is not slowed down. As a matter of fact, the transmission of content such as images requires time and can impede the flow of transactions for the merchant. In order to be able to transmit such transaction content asynchronously, the method includes within the transaction message at least one reference to the photograph or illustration that will be transmitted later, so that the banking institution can establish the link between the transaction and the illustrative information corresponding thereto.

Furthermore, the terminal can also transmit completely (in "batches"), during the same transmission session, the illustrative information stored during the course of one day, for example, instead of sending it to the banking institution one at a time.

According to another aspect, the disclosure relates to a transaction terminal making it possible to conduct a transaction between a client and a merchant, and communicating with said banking institution.

According to the disclosure, a terminal such as this includes:
- means of acquiring at least one piece of information representative of a photograph and/or illustration representative of said merchant, called illustrative information;
- means of inserting said illustrative information or at least one reference to said illustrative information into a transaction message;
- means of transmitting said transaction message to said banking institution.

In this way, the transaction terminal can associate with a transaction a piece of information representative of a photograph and/or illustration representative of the transaction, for example a photograph of the good purchased, and/or representative of the merchant, for example a photograph of the storefront thereof. The terminal can then insert this information into a transaction message, along with other conventional information such as the amount of the transaction, its reference, etc., to the banking institution.

More particularly, the transaction terminal includes means of inserting into said transaction message said photographs and/or illustrations, or at least one reference to said photographs and/or illustrations.

Thus, the terminal can insert a photograph and/or illustration directly into the message.

According to another aspect, the terminal includes means of taking photographs and/or of implementing a connection between a camera device delivering at least one photograph of at least one subject good or service of said transaction.

For example, the terminal is connected to a camera device, e.g., a photographic device, via a wire or wireless connection. This camera device can take photographs of the goods purchased and transmit them to the terminal when the latter so requests it, for example, at the moment when the transaction message is created.

The camera device can also store these photographs and keep them available to the transaction terminal.

According to one alternative, the terminal can itself include a camera device, making it possible to photograph the goods purchased. In this way, the terminal has the photographs at its disposal immediately.

In the case where the terminal does not transmit the photographs and/or illustrations within the transaction message, it also includes means of transmitting to said banking institution at least one photograph and/or illustration representative of said transaction and/or of said merchant, asynchronously in relation to said transaction message.

Thus, the terminal inserts references to the photographs and/or illustrations into the transaction message, which it will later transmit to the banking institution.

According to another aspect, the disclosure relates to a transaction method implemented in a transaction terminal, said terminal making it possible to conduct a transaction between a client and a merchant, and communicating with a banking institution.

According to the disclosure, a method such as this includes the following steps:

- acquisition of at least one piece of information representative of a photograph and/or illustration representative of said merchant, called illustrative information;
- insertion of said illustrative information or at least one reference to said illustrative information into a transaction message;
- transmission of said transaction message to said banking institution.

Yet another aspect of the disclosure relates to a computer program product that is downloadable from a communication network and/or stored on a machine readable medium and/or executable by a microprocessor, containing program code instructions for executing the previously described transaction method, when it is run on a computer.

The disclosure also relates to a data signal transmitted by a client/merchant transaction terminal to a banking institution.

According to the disclosure, such a signal includes at least one data field comprising at least one piece of information representative of at least one photograph and/or at least one illustration for said transaction and/or for said merchant.

Thus, in addition to the conventional data fields such as the transaction reference field or the transaction amount field, the data signal transmitted by the terminal to the banking institution includes a data field making it possible to transmit to the banking institution illustrative information relating to the transaction and/or to the merchant.

More particularly, this information may belong to the group comprising:

- at least one photograph and/or illustration representative of said merchant;
- at least one photograph and/or illustration representative of at least one subject good or service of said transaction;
- at least one hyperlink pointing to a database containing photographs and/or illustrations of said merchant and/or of at least one subject good or service of said transaction;
- at least one hyperlink pointing to an Internet site for said merchant.

Another aspect of the disclosure relates to a server for bank statements representative of at least one transaction between a client and at least one merchant, said statements containing a statement line for each transaction, containing at least one reference for said transaction and/or for said merchant, and an amount corresponding thereto.

According to the disclosure, a server such as this includes:
- means of storing data representative of said transaction;
- means of creating said statement, associating to at least one statement line said data representative of transaction on one hand, and on the other hand at least one of the elements belonging to the group comprising:
  - at least one photograph and/or illustration of said merchant;
  - at least one hyperlink pointing to at least one photograph and/or illustration of said merchant;
  - at least one hyperlink pointing to an Internet site of said merchant;
- means of transmitting said statement.

Thus, the server uses the information received from the transaction terminal to insert into the bank statements one or more hyperlinks pointing to one or more photographs and/or illustrations representative of the transaction or of the merchant, so that, by clicking on these hyperlinks, the client is able to view the photograph(s) relating to the merchant or to the good/service purchased during the transaction.

The server can also insert one or more photographs and/or illustrations representative of the transaction or of the merchant, received by the terminal and stored in a data server, which are then viewable directly by the client when they display their bank statement.

According to one alternative, a server such as this includes means of associating a transaction with at least one photograph of said merchant and/or of at least one subject good or service of said transaction transmitted asynchronously by a mobile terminal, based on at least one parameter belonging to the group comprising:

- timestamp parameters for said transaction and for said photograph of said merchant;
- location parameters for said transaction and for the base station used by said mobile terminal for said transmission of said photograph of said merchant;
- identification parameters for said transaction and for said mobile terminal.

In this case, the photographs can be taken by a client using a mobile telephone, for example. The client can send the photographs taken via a MMS ("Multimedia Messaging Service"), for example, to the banking institution, or the mobile telephone that they are using can have a particular function enabling automatic forwarding of photographs to a banking institution, via a predetermined number.

In the case of forwarding photographs "outside of" the transaction, i.e., by a terminal other than the transaction terminal, the banking institution must be capable of linking the photographs received with the transaction messages sent by the transaction terminal. In order to do so, the banking institution can extract parameters from the transaction messages, which it can compare with characteristics of the photograph transmission.

For example, the time at which the photograph was taken can be compared with the timestamp of the transaction message.

The banking institution can also compare the location of the transaction appearing in the transaction message with the location information from the base station used by the mobile telephone to send the photographs.

An identifier for the transaction, for example the number of the credit card used by the client, and an identifier for the mobile telephone used can also be compared by the banking institution in order to associate the photographs with the transaction corresponding thereto.

The number used by the telephone for transmitting the photographs can also enable identification of the client and the transaction corresponding thereto.

Another aspect of the disclosure relates to a method of enhancing computerized bank statements implemented in a server, said bank statement being representative of at least one transaction between a client and at least one merchant and containing, for each transaction, a statement line containing at least one reference for said transaction and/or for said merchant, and an amount corresponding thereto.

According to the disclosure, a method such as this includes
- a step of storing data representative of said transaction;
- a step of creating said statement, associating to at least one statement line said data representative of transaction on one hand, and on the other hand at least one of the elements belonging to the group comprising:
- at least one photograph and/or illustration of said merchant;
- at least one hyperlink pointing to at least one photograph and/or illustration of said merchant;
- at least one hyperlink pointing to an Internet site of said merchant;

a step of transmitting said statement.

The disclosure also relates to computer program product that is downloadable from a communication network and/or stored on a machine readable medium and/or executable by a microprocessor, containing program code instructions for executing the above-described method for enhancing bank statements, when it is run on a computer.

Another aspect of the disclosure relates to a signal representative of a bank statement sent by a bank statement server, containing at least the following fields for each statement line:
- a transaction reference line;
- a transaction amount line.

According to the disclosure, a signal such as this includes an enhancement field containing at least one of the elements belonging to the group comprising:
- at least one photograph and/or illustration for said merchant;
- at least one hyperlink pointing to at least one photograph and/or illustration for said merchant;
- at least one hyperlink pointing to an Internet site for said merchant.

Thus, the signal sent by the bank statement server to a client terminal includes a field making it possible to add to the conventional bank statement a hyperlink pointing to one or more photographs and/or illustrations representative of the merchant and/or of the subject of the transaction or directly to one or more photographs and/or illustrations representative of the merchant and/or of the subject of the transaction.

BRIEF DESCRIPTION OF THE DRAWINGS

Other characteristics and advantages will become more apparent upon reading the following description of a particular embodiment, given for purely illustrative and non-limiting purposes, and from the appended drawings, in which:

FIG. 3 shows an example of the structure of a signal sent by the transaction terminal according to one particular embodiment of the disclosure;

FIG. 4 shows an example of a portion of FIG. 1 corresponding to the bank statement server according to one particular embodiment of the disclosure;

FIG. 5 shows an example of a portion of FIG. 1 corresponding to the client terminal according to one particular embodiment of the disclosure; and FIGS. 6A and 6B show an example of a bank statement on a client terminal according to one particular embodiment of the disclosure.

DETAILED DESCRIPTION OF ILLUSTRATIVE EMBODIMENTS

The basic principle of an exemplary aspect of the disclosure is based on the implementation of a method of transmitting illustrative information representative of a transaction between a client and a merchant and/or of a merchant with whom a transaction has been conducted.

More precisely, according to one particular embodiment of the disclosure, a method such as this makes it possible to supply the client with information representative of the transaction and/or of the merchant, by means of a bank statement server of a banking institution, which manages their transactions.

In particular, a method such as this enables transmission of illustrative information, such as photographs or illustrations, relating to the merchant and/or to the subject goods or services of the transaction.

Figure 1:
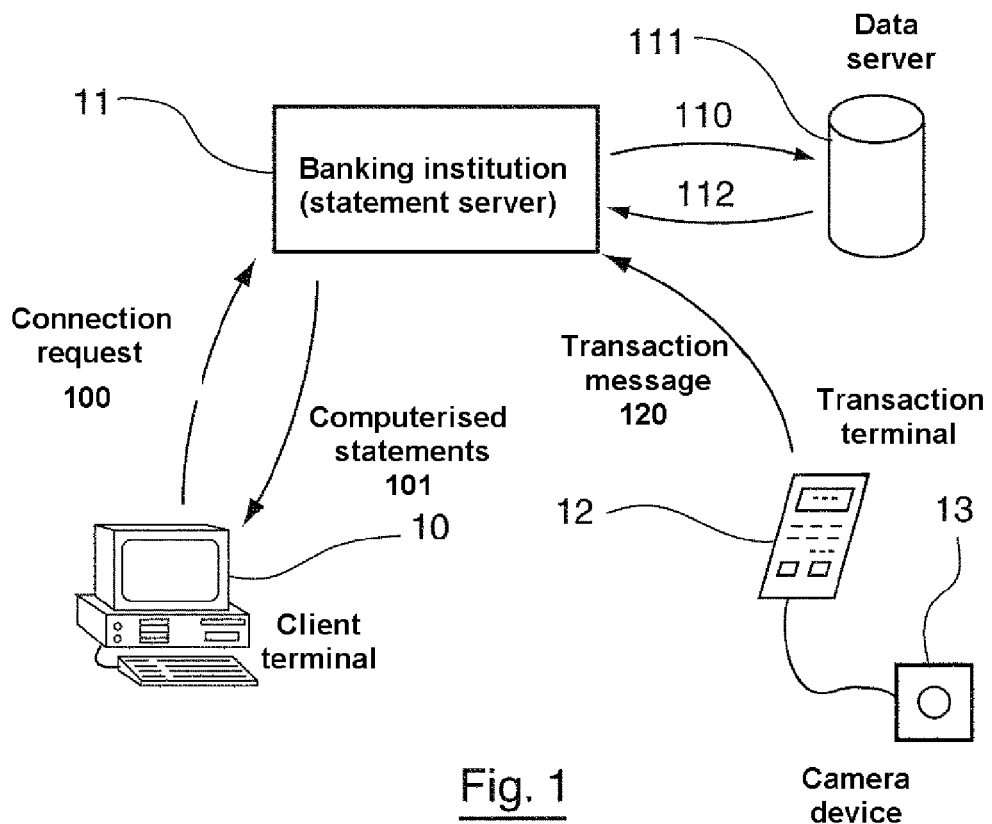
FIG. 1 shows a schematic diagram of a system for accessing data representative of transactions in which an embodiment of the disclosure is implemented.

A system implementing such a method according to one particular embodiment of the disclosure will now be presented in relation to FIG. 1.

In this example, a transaction between a client and a merchant is considered, which is managed by means of a transaction terminal 12.

This transaction terminal 12 is connected to a camera device 13, enabling it to obtain photographs of the transaction, which are then stored, in order to obtain photographs of the subject goods or services of the transaction, for example.

According to one alternative of this embodiment, the terminal 12 can itself take photographs of the transaction, in order to avoid connection with an external photographic device, and to thereby facilitate implementation of the method according to the disclosure.

The transaction terminal can also store illustrations and/or photographs representative of the merchant or of the business in which it is used.

In this way, the terminal 12 manages in memory illustrative information representative of the merchant or business and/or representative of the subject goods or services of the transaction.

According to one alternative of this embodiment, this illustrative information can also be stored in an external database.

The terminal then creates a transaction message 120, intended to be sent to the banking institution, into which, in addition to the conventional transaction information, it inserts the illustrative information relating to the transaction or to the merchant that it has in memory.

The banking institution, and more particularly the associated bank statement server 11, then receives the transaction message 120 and, via a port 110, stores the illustrative information inserted into the transaction message by the transaction terminal 12 in a database on a data server 111.

According to one alternative, not shown in FIG. 1, the terminal can transmit the illustrative information within one or more messages separate from the transaction message, in a time-delayed manner in relation to the latter.

As a matter of fact, the transmission of messages containing images can take time, in particular due to their size, and is therefore likely to overload the information transmissions carried out for transactions between a terminal and a banking institution.

Thus, by delaying the transmission of such messages, the method according to this alternative avoids slowing down the merchant's client flow. In order to accomplish this, the terminal inserts a reference to the image associated with the transaction into the transaction message, which image it will later transmit along with this same reference.

This alternative also enables "batch" sending of photographs or illustrations corresponding to the transactions conducted in one day, for example. This transfer can be carried out at night.

In the case of delayed transfer, the banking institution records the reference when it receives the transaction message, and uses it when it receives the delayed messaged containing the illustrative information, in order to recognise this information and associate it with the transaction corresponding thereto.

The bank statement server 11 then creates a statement in which it associates with a line corresponding to a transaction at least one hyperlink 112 to the illustrative information data corresponding thereto.

In the embodiment described herein below, the statement is a computerized statement, which the client can view on a conventional terminal (computer, cellular telephone, PDA, etc.). When, by means of a connection request 100 from their terminal 10, the client is connected to the banking institution managing their transactions, they obtain, during a step 101, one or more computerized statements on which the data representative of their transactions appears.

Figure 2:
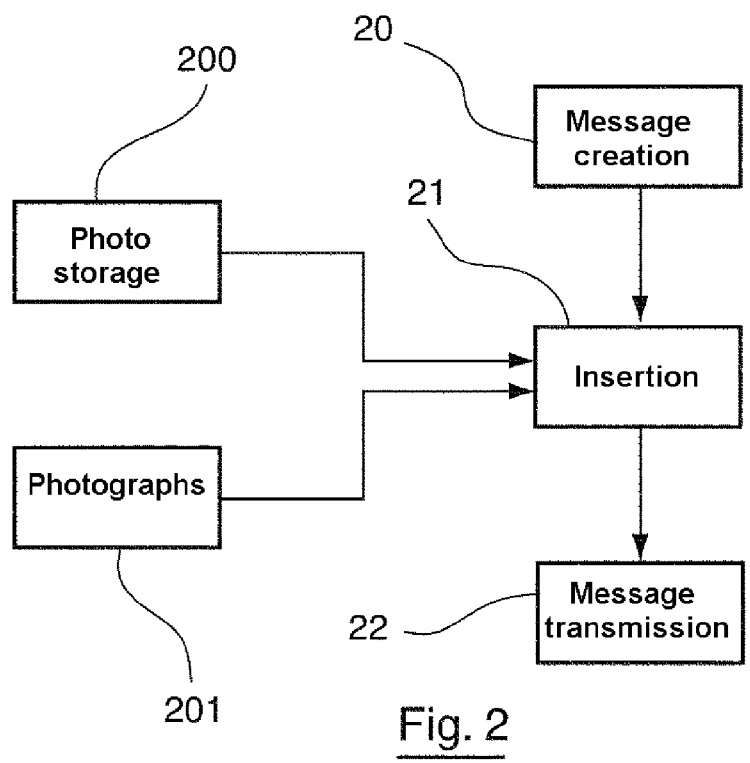
FIG. 2 shows an example of a portion of FIG. 1 corresponding to the transaction terminal according to one particular embodiment of the disclosure.

The method implemented in the transaction terminal according to this particular embodiment of the disclosure is shown in relation to FIG. 2.

When a transaction takes place by means of the transaction terminal, the latter creates a transaction message during a creation step 20, in which it inserts data relating in particular to the amount of the transaction, the date of the transaction, etc.

According to this particular embodiment of the disclosure, during an insertion step 21, the terminal also inserts one or more illustrations/photographs representative of the merchant, which are stored in memory during a step 200, e.g., during activation of the terminal and possibly later during updates by the merchant, and/or one or more illustrations/photographs representative of the transaction, i.e., of the subject goods or services of the transaction, obtained during a step 201 by means of a camera device connected to the transaction terminal.

Thus, during the transaction, the camera device can photograph the goods purchased and transmit the photographs to the transaction terminal to be stored in memory.

According to an alternative of this embodiment, the terminal can itself take photographs, without calling upon an external camera device.

According to yet another alternative of this embodiment, not shown in FIG. 2, the photographs and/or illustrations can be transmitted asynchronously in relation to the transaction message.

The method according to an exemplary aspect of disclosure also includes a transmission step 22 during which the transaction terminal transmits the transaction message thus completed to the corresponding banking institution, and more particularly to the bank statement server of the banking institution.

An example of the structure of the signal thus transmitted from the transaction terminal to the banking institution is shown in FIG. 3.

The transaction message 120 can consist of various predetermined fields which can be specific to the terminal and/or to the banking institution managing the transactions, and comprise the following information in particular:

a transaction reference 30, possibly being an identification number, a wording specifying the subject of the transaction (good or service), an identifier for the merchant or for the business, etc. (e.g., "ABC Corporation");

a transaction amount 31, in a predetermined format capable of being converted into various currencies, for example (e.g., Euros and Francs);

a photograph/illustration 32 representative of the merchant (e.g., a photograph of the storefront or exterior business sign);

a photograph/illustration 33 representative of the subject good and/or service of the transaction (e.g., a photograph of the bouquet of flowers purchased at a florist or a photograph of the hotel room reserved at a hotel establishment).

In this way, the banking institution can have the necessary information at their disposal for creating computerized statements corresponding to the transactions conducted by the client.

FIG. 4 shows the method implemented in the bank statement server of the banking institution according to this particular embodiment of the disclosure.

During a receiving step 40, the bank statement server receives a transaction message coming from a transaction terminal and processes it for the purpose of creating bank statements for the client.

During a step 41, the server stores the photographs/illustrations representative of the merchant and/or of the transaction in a data server, so as to be able to later access it when requested by the user.

During a creation step 42, the server then creates a computerized statement, taking into account the last transactions conducted by the client, by associating a transaction with each line, by then inserting, during an insertion step 43, one/several hyperlinks pointing to the photographs/illustrations representative of the merchant and/or of the transaction previously stored on a data server.

Following a request by the client, via a client terminal, the server, during a transmission step 44, then transmits the computerized statement to the client terminal.

According to one alternative of this embodiment, the server can also transmit the computerized statement to the client terminal automatically and regularly, without any client request to do so (e.g., routine sending of the statement every 15 days via electronic mail). It is also this approach that will typically be adopted in the case of a paper statement.

FIG. 5 shows access to the bank statements of a client via a client terminal, according to this particular embodiment of the disclosure.

The client is first connected to the bank statement server, during a connection step 50, via a port to the banking institution managing their transactions.

During a step 51, they access a page displaying their bank statement on their terminal display screen, listing the last transactions that they have conducted.

The client can then access detailed information relating to the merchants or the subjects of the various transactions by clicking on the hyperlinks present on each line of the statement. The photographs/illustrations for the merchants, subject goods or services of the transactions are thereby displayed, during a step 52, on the display screen of their client terminal.

A computerized statement such as this is shown in FIGS. 6A and 6B, according to this particular embodiment of the disclosure, before and after displaying the photographs/illustrations for the merchants, subject goods or services of the transactions, respectively, after the client has clicked on the available hyperlink(s) on each line of the statement.

FIG. 6A shows an example of a bank statement as the client sees it displayed on the display screen of their client terminal, according to this particular embodiment of the disclosure.

Lines 60, 61, 62 . . . each correspond to a transaction conducted by the client.

The information which is transmitted by the transaction terminal and processed by the bank statement server of the banking institution appears on each line and may consist of:

the date of the transaction 600;

a reference for the transaction 601, possibly being an identification number, a wording specifying the subject of the transaction (good or service), an identifier for the merchant or for the business, etc.;

a transaction amount 602, in a predetermined format capable of being converted, for example, into various currencies (e.g., Euros and Francs);

a hyperlink 603A pointing to an illustration representative of the merchant, e.g., a view of the shop window, of the merchant himself, a logo, an Internet site, etc.;

a hyperlink 604A pointing to a photograph representative of the subject good of the transaction (this can also be a hyperlink pointing to an illustration representative of a subject service of the transaction, e.g., a photograph of a hotel or the room itself, in the case of a hotel room reservation).

If need be, the statement can show other information. Of course, other formats and presentations of the data are possible.

When the client wishes to have more information relating to the transaction on line 60, they can therefore click on the hyperlinks 603A, 604A at their disposal at the end of the lines and simultaneously or not display the illustrations/photographs corresponding thereto.

They thereby obtain a bank statement as shown in FIG. 6B, in which they can view the illustration 603B representative of the merchant (a florist in this case) and the photograph representative of the subject good of the transaction 604B (a bouquet of flowers in this case).

According to one alternative of this particular embodiment not shown here, the bank server can also enable the client to display the illustrations and photographs in a separate window, as a full page or in a format of their choice.

According to another alternative, the statement as shown in FIG. 6B can be delivered to the client directly, without having to click on any links. It can also be printed in this form by the banking institution, and then mailed to the client.

One or more aspects of the disclosure thus make it possible to provide a novel, ergonomic and efficient service to the client. This service can be provided free-of-charge or for a fee. In the latter case, the billing can be all-inclusive or based on the use of the service (e.g., proportional to the number of queries, by hyperlink activation, and/or by the number of photographs transmitted by the user).

One or more aspects of the disclosure mitigate disadvantages of the prior art.

More precisely, an aspect of the disclosure offers improved ergonomics for reading bank statements.

An aspect of the disclosure enables easy management capabilities for clients viewing their bank statements, by giving them access to more accurate information.

An aspect of the disclosure provides improved legibility of bank statements, by making them more detailed and more user-friendly, at least-cost and simple to use.

Although the present disclosure have been described with reference to one or more examples, workers skilled in the art will recognize that changes may be made in form and detail without departing from the spirit and scope of the disclosure and/or the appended claims.

What is claimed is:

1. A method of supplying data representative of transactions between a client and at least one merchant, via a banking institution, said banking institution issuing a statement to said client which, for each transaction, includes a statement line containing at least one reference for said transaction and/or said merchant, and an amount corresponding thereto, said method comprising:

a transaction phase comprising:

storing data representative of said transaction, in a statement server;

acquiring and storing in an illustrative data server at least one information representative of a photograph and/or illustration representative of said merchant, called illustrative information; and transmitting a transaction message from a transaction terminal of said merchant to the banking institution, said transaction message containing at least one reference to said illustrative information, called an illustrative reference, recorded by said banking institution;

a supplying phase of said statement comprising:

creating said statement, associating to at least one of said statement lines said data representative of said transaction on one hand, and on the other hand at least some of said illustrative information, and/or at least one information pointing via a hyperlink to at least some of said illustrative information, called access information;

transmitting said statement;

storing some of said illustrative information, corresponding to said illustrative reference, in the transaction terminal and transmitting said some of the illustrative information in a delayed message, by said transaction terminal, to said banking institution after the transmission of said transaction message, asynchronously with respect to said transaction message; and using the illustrative reference to recognize the illustrative information and associate the illustrative information with said transaction message, by said banking institution.

2. The method of claim 1, wherein said statement is a computerized statement capable of being viewed on a client terminal.

3. The method of claim 1, wherein said transaction phase comprises:

acquiring at least one photograph and/or illustration representative of said merchant;

creating the transaction message containing data representative of a transaction and data corresponding to said at least one photograph and/or illustration.

4. The method of claim 3, wherein at least one of said photographs and/or illustrations is stored in the transaction terminal of said merchant, and is included in said transaction message.

5. The method of claim 1, wherein at least one of said photographs and/or illustrations is transmitted by said transaction terminal to said banking institution before said transaction phase and stored in said data server.

6. The method of claim 1, wherein said illustrative information includes a hyperlink leading to an Internet site of said merchant.

7. The method of claim 1, wherein said method includes obtaining at least one photograph by a camera device connected to or built into a transaction terminal configured to acquire at least one information representative of a photograph and/or illustration representative of said merchant.

8. A transaction terminal enabling a transaction to be conducted between a client and a merchant, and communicating with a banking institution, wherein said terminal includes:
   a processor; and
   a machine-readable medium storing program code instructions executable by the processor to perform steps comprising:
      acquiring at least one piece of illustrative information representative of a photograph and/or illustration representative of said merchant;
      storing at least some of said illustrative information in the transaction terminal;
      inserting at least one reference to said illustrative information into a transaction message by said processor, said reference being called an illustrative reference, recorded by said banking institution;
      transmitting said transaction message from said transaction terminal to said banking institution; and
      transmitting, in a delayed message, the illustrative information stored in the transaction terminal and said illustrative reference, to said banking institution asynchronously with respect to the transaction message after the transmission of said transaction message, said delayed message being configured to initiate a processing by the banking institution of the illustrative reference in said delayed message to recognize the illustrative information and associate the illustrative information with said transaction message and to create a statement associating to at least one of statement lines data representative of said transaction on one hand, and on the other hand at least some of said illustrative information, and/or at least one information pointing via a hyperlink to at least some of said illustrative information, called access information.

9. The transaction terminal of claim 8, wherein said transaction terminal includes means for taking photographs and/or for implementing a connection between a camera device delivering at least one photograph of said merchant.

10. A transaction method enabling a transaction to be conducted between a client and a merchant, and communicating with a banking institution, wherein said method comprises:
   acquiring at least one piece of information representative of a photograph and/or illustration representative of said merchant, called illustrative information, by a transaction terminal, wherein the transaction terminal is configured to conduct a transaction between a client and a merchant and is configured to communicate with a banking institution;
   inserting at least one reference to said illustrative information into a transaction message by a processor in said transaction terminal, said reference being called an illustrative reference, recorded by said banking institution;
   transmitting said transaction message from said transaction terminal to said banking institution;
   transmitting, in a delayed message, the illustrative information acquired by the transaction terminal, corresponding to said illustrative reference, to said banking institution asynchronously with respect to the transaction message after the transmission of said transaction message;
   using, by said banking institution, the illustrative reference to recognize the illustrative information and associate the illustrative information with said transaction method; and
   creating, by said banking institution, a statement, associating to at least one of statement lines data representative of said transaction on one hand, and on the other hand at least some of said illustrative information, and/or at least one information pointing via a hyperlink to at least some of said illustrative information, called access information.

11. A method of enhancing a computerized bank statement implemented in a server, said bank statement being representative of at least one transaction between a client and at least one merchant and containing, for each transaction, a statement line containing at least one reference for said transaction and/or for said merchant, and an amount corresponding thereto, wherein said method comprises:
   storing data representative of said transaction;
   receiving at least one photograph and/or illustration of said merchant, as a delayed message, after transmission of a transaction message corresponding to said transaction, asynchronously with respect to the transaction message;
   creating said statement, associating to at least one statement line said data representative of the transaction on one hand, and on the other hand at least one of the elements belonging to the group comprising:
      said at least one photograph and/or illustration of said merchant;
      at least one hyperlink pointing to said at least one photograph and/or illustration of said merchant; and
      at least one hyperlink pointing to an Internet site of said merchant; and
   transmitting said statement.

12. A method of supplying data representative of transactions between a client and at least one merchant, via a banking institution,
   said banking institution issuing a statement to said client which, for each transaction, includes a statement line containing at least one reference for said transaction and/or said merchant, and an amount corresponding thereto,
   said method comprising:
      a transaction phase comprising:
         storing data representative of said transaction, in a statement server;
         acquiring and storing in an illustrative data server of at least one information representative of a photograph and/or illustration representative of said merchant, called illustrative information; and
         receiving a transaction message from a transaction terminal of said merchant, said transaction message containing at least one reference to said illustrative information, called an illustrative reference, recorded by said banking institution;
      a supplying phase of said statement comprising:
         creating said statement, associating to at least one of said statement lines said data representative of said transaction on one hand, and on the other hand at least some of said illustrative information, and/or at least one information pointing via a hyperlink to at least some of said illustrative information, called access information, said illustrative information being chosen according to the transaction content;
         transmitting said statement;
         storing some of said illustrative information, corresponding to said illustrative reference, in said transaction terminal of said merchant transmitting said some of the illustrative information from said transaction terminal to said banking institution in a delayed message after the transmission of said transaction message, asynchronously with respect to said corresponding transaction message; and using the illustrative reference to recognize the illustrative information and associate the illustrative information with said transaction message, by said banking institution.

\* \* \* \* \*

UNITED STATES PATENT AND TRADEMARK OFFICE
CERTIFICATE OF CORRECTION

PATENT NO. : 8,219,469 B2
APPLICATION NO. : 11/924323
DATED : July 10, 2012
INVENTOR(S) : David Naccache Page 1 of 1

It is certified that error appears in the above-identified patent and that said Letters Patent is hereby corrected as shown below:

On the Title Page, Item (73) Assignee:

In line 1 of the Assignee, delete "Financiero" and insert -- Financiere --

Signed and Sealed this
Sixteenth Day of June, 2015

Michelle K. Lee
*Director of the United States Patent and Trademark Office*